(12) United States Patent
Hoyle et al.

(10) Patent No.: US 10,657,115 B2
(45) Date of Patent: *May 19, 2020

(54) METHODS AND APPARATUSES FOR IMPROVED DATA MODELING USING A RELATIONAL DATABASE MANAGEMENT SYSTEM

(71) Applicant: MCKESSON CORPORATION, San Francisco, CA (US)

(72) Inventors: Keith Hoyle, Montgomery, TX (US); Manuel Salgado, Spring, TX (US); Marion A. Brown, Spring, TX (US); Rajesh Yalamanchili, Conroe, TX (US)

(73) Assignee: MCKESSON CORPORATION, San Francisco, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 15/086,266

(22) Filed: Mar. 31, 2016

(65) Prior Publication Data

US 2017/0286468 A1    Oct. 5, 2017

(51) Int. Cl.
*G06F 7/00*     (2006.01)
*G06F 16/22*    (2019.01)
(Continued)

(52) U.S. Cl.
CPC ........ *G06F 16/2282* (2019.01); *G06F 16/212* (2019.01); *G06F 16/2322* (2019.01); *G06F 16/245* (2019.01)

(58) Field of Classification Search
CPC ......... G06F 17/30339; G06F 17/30353; G06F 17/30294; G06F 17/30424; G06F 17/30297; G06F 17/30392; G06F 2206/10; G06F 17/30911; G06F 17/30917; G06F 17/30887
(Continued)

(56) References Cited

U.S. PATENT DOCUMENTS 5,560,005 A *   9/1996   Hoover ............. G06F 17/30424
6,175,837 B1 *  1/2001   Sharma ............. G06F 17/30607
(Continued)

OTHER PUBLICATIONS

Anchor Modeling—Wikipedia, the free encyclopedia [online] [retrieved May 3, 2016]. Retrieved from the Internet: <URL: https://en.wikipedia.org/wiki/Anchor_modeling>. 3 pages.
(Continued)

*Primary Examiner* — Mohammed R Uddin
(74) *Attorney, Agent, or Firm* — Ballard Spahr LLP

(57) ABSTRACT

Embodiments are disclosed for improved data modeling in a relational database management system. In the context of a method, an example embodiment includes ingesting, by data ingestion circuitry, one or more records into one or more stage tables in a staging layer. This example embodiment further includes generating, by data modeling circuitry, a data alignment table defining a unique set of data fields, and generating, by the data modeling circuitry and using the one or more stage tables and the data alignment table, a key mapping table identifying correspondences between data fields in the one or more stage tables and data fields in the data alignment table. Corresponding apparatuses and computer program products are also provided.

20 Claims, 8 Drawing Sheets

(51) Int. Cl.
*G06F 16/21* (2019.01)
*G06F 16/245* (2019.01)
*G06F 16/23* (2019.01)

(58) Field of Classification Search
USPC .............................. 707/803, 808, 811, 791
See application file for complete search history.

(56) References Cited

U.S. PATENT DOCUMENTS

| | | | | |
|---|---|---|---|---|
| 6,738,798 | B1* | 5/2004 | Ploetz | A61B 6/56 |
| | | | | 345/581 |
| 6,801,915 | B1* | 10/2004 | Mack | G06F 17/30371 |
| 7,822,710 | B1* | 10/2010 | Miller | G06F 17/30997 |
| | | | | 707/620 |
| 8,341,191 | B2* | 12/2012 | Weinberg | G06F 17/30607 |
| | | | | 707/791 |
| 9,684,512 | B2* | 6/2017 | Bai | G06F 9/30079 |
| 9,805,081 | B2* | 10/2017 | Scott | G06F 17/30345 |
| 2004/0034550 | A1* | 2/2004 | Menschik | G06F 19/322 |
| | | | | 705/3 |
| 2004/0078236 | A1* | 4/2004 | Stoodley | G06F 19/322 |
| | | | | 705/2 |
| 2005/0050068 | A1* | 3/2005 | Vaschillo | G06F 17/30569 |
| 2006/0036624 | A1* | 2/2006 | Hild | G06F 17/30563 |
| 2006/0136469 | A1* | 6/2006 | Dettinger | G06F 17/30427 |
| 2008/0092112 | A1 | 4/2008 | Jin et al. | |
| 2010/0125579 | A1* | 5/2010 | Pardoe | G06F 17/30917 |
| | | | | 707/736 |
| 2011/0004622 | A1* | 1/2011 | Marson | G06Q 10/06 |
| | | | | 707/770 |
| 2011/0110515 | A1* | 5/2011 | Tidwell | H04N 21/23109 |
| | | | | 380/200 |
| 2013/0268567 | A1* | 10/2013 | Adjei-Banin | G06F 16/254 |
| | | | | 707/812 |
| 2016/0085914 | A1* | 3/2016 | Douglass | G06F 19/322 |
| | | | | 705/3 |
| 2016/0357839 | A1* | 12/2016 | Hiltz-Laforge | |
| | | | | G06F 17/30592 |

OTHER PUBLICATIONS

Data Vault Modeling—Wikipedia, the free encyclopedia [online] [retrieved May 3, 2016]. Retrieved from the Internet: <URL: https://en.wikipedia.org/wiki/Data_Vault_modeling>. 11 pages.
Non-Final Office Action dated Oct. 5, 2018 by the U.S. Patent and Trademark Office for U.S. Appl. No. 15/086,534, filed Mar. 31, 2016 and published as US 2017/0286504 on Oct. 5, 2017 (Inventor—Hoyle et al.; Applicant—McKesson Corp.) (33 pages).

* cited by examiner

METHODS AND APPARATUSES FOR IMPROVED DATA MODELING USING A RELATIONAL DATABASE MANAGEMENT SYSTEM

TECHNOLOGICAL FIELD

Example embodiments of the present invention relate generally to database modeling and, more particularly, to methods and apparatuses increasing the efficiency and reliability of database modeling platform.

BACKGROUND

Traditional data modeling techniques suffer from a variety of defects. For instance, many traditional data modeling techniques (e.g., anchor modeling and data vault modeling) require one to understand what information will be important in a resulting data model (e.g., what data users need to review, and how would they view the data) prior to implementation. This information is typically the result of one or more Joint Application Design (JAD) sessions between various stakeholders involved in the implementation of the data model.

Similarly, such modeling techniques require a granular understanding of the data sources so that the relevant information can be harvested. Thus, one must learn how to decipher the types of data contained in records received from the various data sources, and one must also learn how that data is organized so it can be retrieved accurately and completely. Because the implementation of traditional modeling schemes requires that all of this must be known prior to implementation of the data model, there is a significant delay incurred before one can even begin to use a new data modeling platform.

Another downside to implementation of existing data modeling techniques is that they often carry a lack of transparency back to the data sources. In environments where records are subject to audit (e.g., due to laws or regulations governing sensitive information), changes to source data must be well-documented. Accordingly, traditional data modeling techniques that manipulate data end up becoming themselves subject to audit.

Finally, when data modeling platforms utilize transient staging areas, processing errors that extend past the retention window for transient data are not recoverable.

BRIEF SUMMARY

Example embodiments described herein address the above deficiencies and provide methods and apparatuses that can increase the efficiency and reliability of a database modeling platform. Specifically, example embodiments enable the ingestion of data before (or in parallel with) determining what underlying information will be important to the organization or understanding the structure and contents of the underlying data sources.

Similarly, example embodiments described herein provide complete traceability and clarity regarding the evolution of modeled data received from the data sources, thus ensuring that the data modeling platform can efficiently respond in the event of an audit. In this regard, implementation of example embodiments may in fact exclude the data modeling platform from audit in the first place, as the techniques described herein do not alter the underlying source data in the first place.

In a first example embodiment, a method is provided for improved data modeling in a relational database management system. The method includes ingesting, by data ingestion circuitry, one or more records from a plurality of data sources into one or more stage tables in a staging layer. In this regard, each of the one or more stage tables corresponds to one of the plurality of data sources. The method further includes generating, by data modeling circuitry, a data alignment table defining a unique set of data fields, and generating, by the data modeling circuitry and using the one or more stage tables and the data alignment table, a key mapping table identifying correspondences between data fields in the one or more stage tables and data fields in the data alignment table.

In some embodiments, the method includes processing a query requesting information for retrieval, identifying, by the data modeling circuitry, using the key mapping table, and from a subset of the one or more stage tables and the data alignment table, data corresponding to the information for retrieval, and outputting the identified data.

In some embodiments, ingesting a target record from a particular data source includes storing a copy of the target record in a particular stage table in the staging layer that corresponds to the particular data source, inserting plumbing fields into the copy of the target record, the plumbing fields comprising a set of descriptive fields and a timestamp field, populating the descriptive fields based on content of the target record, and populating the timestamp field with a current date and time.

In some embodiments, ingesting the one or more records into the one or more stage tables in the staging layer includes, for each particular record of the one or more records, determining whether the particular record corresponds to a preexisting record in one of the stage tables in the staging layer. In an instance in which the particular record corresponds to a preexisting record, the method may further include determining whether the particular record is different than the preexisting record. In some such embodiments where the particular record is different than the preexisting record, the method may include storing the particular record. However, in an instance in which the particular record does not correspond to a preexisting record, the method may include storing the particular record without this difference determination.

In some embodiments, the step of generating the data alignment table is performed after ingesting the one or more records from the plurality of data sources.

In some embodiments, the data alignment table comprises a domain table or a relator table.

In some embodiments, generating the data alignment table may include identifying, by the data modeling circuitry and within one of the one or more stage tables, a record having a unique combination of values for the unique set of data fields defined by the data alignment table, generating, by the data modeling circuitry, a new record in the data alignment table corresponding to the identified record, and populating fields in the data alignment table for the generated record based on the unique combination of values.

In some such embodiments, the method may further include ingesting, by the data ingestion circuitry, one or more additional records from the plurality of data sources into the one or more stage tables in the staging layer, and updating, by the data modeling circuitry, the data alignment table and the key mapping table based on ingested one or more additional records.

In a second example embodiment, an apparatus is provided for improved data modeling in a relational database management system. The apparatus includes at least one processor and at least one memory storing computer-executable instructions, that, when executed by the at least one processor, cause the apparatus to ingest one or more records from a plurality of data sources into one or more stage tables in a staging layer. In this regard, each of the one or more stage tables corresponds to one of the plurality of data sources. The computer-executable instructions, when executed by the at least one processor, further cause the apparatus to generate a data alignment table defining a unique set of data fields, and generate, using the one or more stage tables and the data alignment table, a key mapping table identifying correspondences between data fields in the one or more stage tables and data fields in the data alignment table.

In some embodiments, the computer-executable instructions, when executed by the at least one processor, further cause the apparatus to process a query requesting information for retrieval, identify, using the key mapping table and from a subset of the one or more stage tables and the data alignment table, data corresponding to the information for retrieval, and output the identified data.

In some embodiments, the computer-executable instructions, when executed by the at least one processor, cause the apparatus to ingest a target record from a particular data source by causing the apparatus to store a copy of the target record in a particular stage table in the staging layer that corresponds to the particular data source, insert plumbing fields into the copy of the target record, the plumbing fields comprising a set of descriptive fields and a timestamp field, populate the descriptive fields based on content of the target record, and populate the timestamp field with a current date and time.

In some embodiments, ingesting the one or more records into the one or more stage tables in the staging layer includes, for each particular record of the one or more records, determining whether the particular record corresponds to a preexisting record in one of the stage tables in the staging layer. In an instance in which the particular record corresponds to a preexisting record, the computer-executable instructions, when executed by the at least one processor, may further cause the apparatus to determine whether the particular record is different than the preexisting record. In some such embodiments where the particular record is different than the preexisting record, the computer-executable instructions, when executed by the at least one processor, further cause the apparatus to store the particular record. However, in an instance in which the particular record does not correspond to a preexisting record, the computer-executable instructions, when executed by the at least one processor, further cause the apparatus to store the particular record without this difference determination.

In some embodiments, the computer-executable instructions, when executed by the at least one processor, cause the apparatus to generate the data alignment table after ingestion of the one or more records from the plurality of data sources.

In some embodiments, the data alignment table comprises a domain table or a relator table.

In some embodiments, generating the data alignment table may include identifying, within one of the one or more stage tables, a record having a unique combination of values for the unique set of data fields defined by the data alignment table, generating a new record in the data alignment table corresponding to the identified record, and populating fields in the data alignment table for the generated record based on the unique combination of values.

In some such embodiments, the computer-executable instructions, when executed by the at least one processor, may further cause the apparatus to ingest one or more additional records from the plurality of data sources into the one or more stage tables in the staging layer, and update the data alignment table and the key mapping table based on ingested one or more additional records.

In a third example embodiment, a computer program product comprising at least one non-transitory computer-readable storage medium is provided for improved data modeling in a relational database management system, the at least one non-transitory computer-readable storage medium storing computer-executable instructions that, when executed, cause an apparatus to ingest one or more records from a plurality of data sources into one or more stage tables in a staging layer. In this regard, each of the one or more stage tables corresponds to one of the plurality of data sources. The computer-executable instructions, when executed, further cause the apparatus to generate a data alignment table defining a unique set of data fields, and generate, using the one or more stage tables and the data alignment table, a key mapping table identifying correspondences between data fields in the one or more stage tables and data fields in the data alignment table.

In some embodiments, the computer-executable instructions, when executed, further cause the apparatus to process a query requesting information for retrieval, identify, using the key mapping table and from a subset of the one or more stage tables and the data alignment table, data corresponding to the information for retrieval, and output the identified data.

In some embodiments, the computer-executable instructions, when executed, cause the apparatus to ingest a target record from a particular data source by causing the apparatus to store a copy of the target record in a particular stage table in the staging layer that corresponds to the particular data source, insert plumbing fields into the copy of the target record, the plumbing fields comprising a set of descriptive fields and a timestamp field, populate the descriptive fields based on content of the target record, and populate the timestamp field with a current date and time.

In some embodiments, ingesting the one or more records into the one or more stage tables in the staging layer includes, for each particular record of the one or more records, determining whether the particular record corresponds to a preexisting record in one of the stage tables in the staging layer. In an instance in which the particular record corresponds to a preexisting record, the computer-executable instructions, when executed, may further cause the apparatus to determine whether the particular record is different than the preexisting record. In some such embodiments where the particular record is different than the preexisting record, the computer-executable instructions, when executed, further cause the apparatus to store the particular record. However, in an instance in which the particular record does not correspond to a preexisting record, the computer-executable instructions, when executed, further cause the apparatus to store the particular record without this difference determination.

In some embodiments, the computer-executable instructions, when executed, cause the apparatus to generate the data alignment table after ingestion of the one or more records from the plurality of data sources.

In some embodiments, the data alignment table comprises a domain table or a relator table.

In some embodiments, generating the data alignment table may include identifying, within one of the one or more stage tables, a record having a unique combination of values for the unique set of data fields defined by the data alignment table, generating a new record in the data alignment table corresponding to the identified record, and populating fields in the data alignment table for the generated record based on the unique combination of values.

In some such embodiments, the computer-executable instructions, when executed, may further cause the apparatus to ingest one or more additional records from the plurality of data sources into the one or more stage tables in the staging layer, and update the data alignment table and the key mapping table based on ingested one or more additional records.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Figure 1:
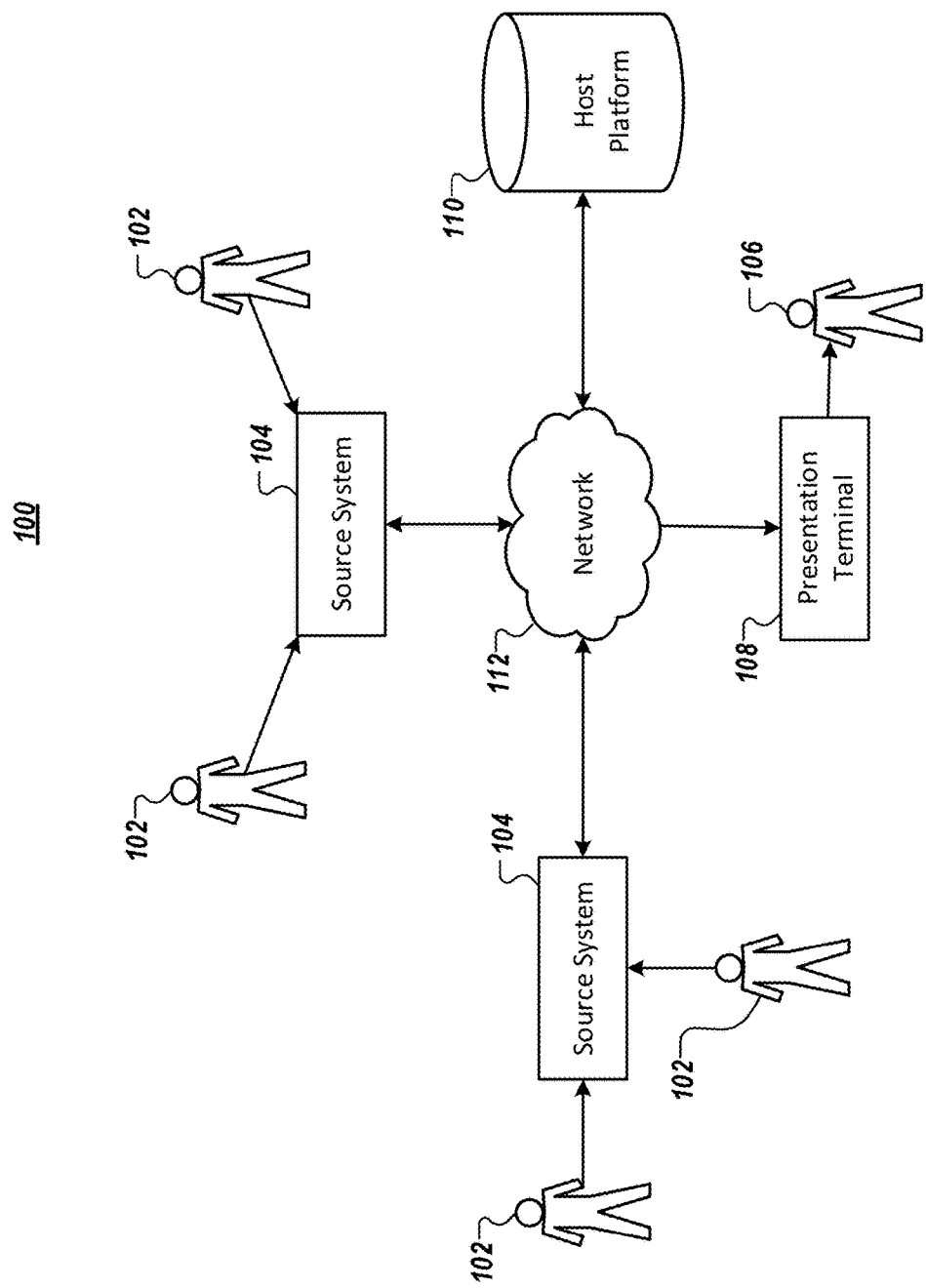
FIG. 1 illustrates a diagram illustrating a typical system relying upon a data modeling platform.

FIG. 1 illustrates a diagram illustrating a typical system 100 relying upon a data modeling platform. As shown in FIG. 1, a series of users 102 may enter data at various times and/or places into various source systems 104. For instance, this data may comprise healthcare provider information regarding a particular patient who has visited a hospital and who has separately visited a doctor's office. The users 102 entering data about that patient may be the various nurses or doctors working at these two locations. Separately, a user 106 (who may, for instance, be another healthcare provider), may be interested in retrieving information about the patient from a presentation terminal 108 (e.g., a computer at the office of user 106). In a global system connected by a network 112 (e.g., the Internet), a host platform 110 may utilize various data modeling techniques designed to manage this process and provide the user 106 with relevant information retrieved from the disparate source systems 104.

However, as mentioned above, many traditional approaches for modeling the data from various source systems 104 present significant problems. The host platform 110 may not be able to retrieve data from source systems 104 until it is known what information is important for the host platform 110, and at the same time many traditional approaches introduce the possibility of unrecoverable processing errors and/or are not designed to adequately respond to audits. Through use of type-2 data warehousing in connection with a flyweight modeling schema, example embodiments disclosed herein provide solutions that can increase the efficiency and reliability of a data modeling platform.

Figure 2:
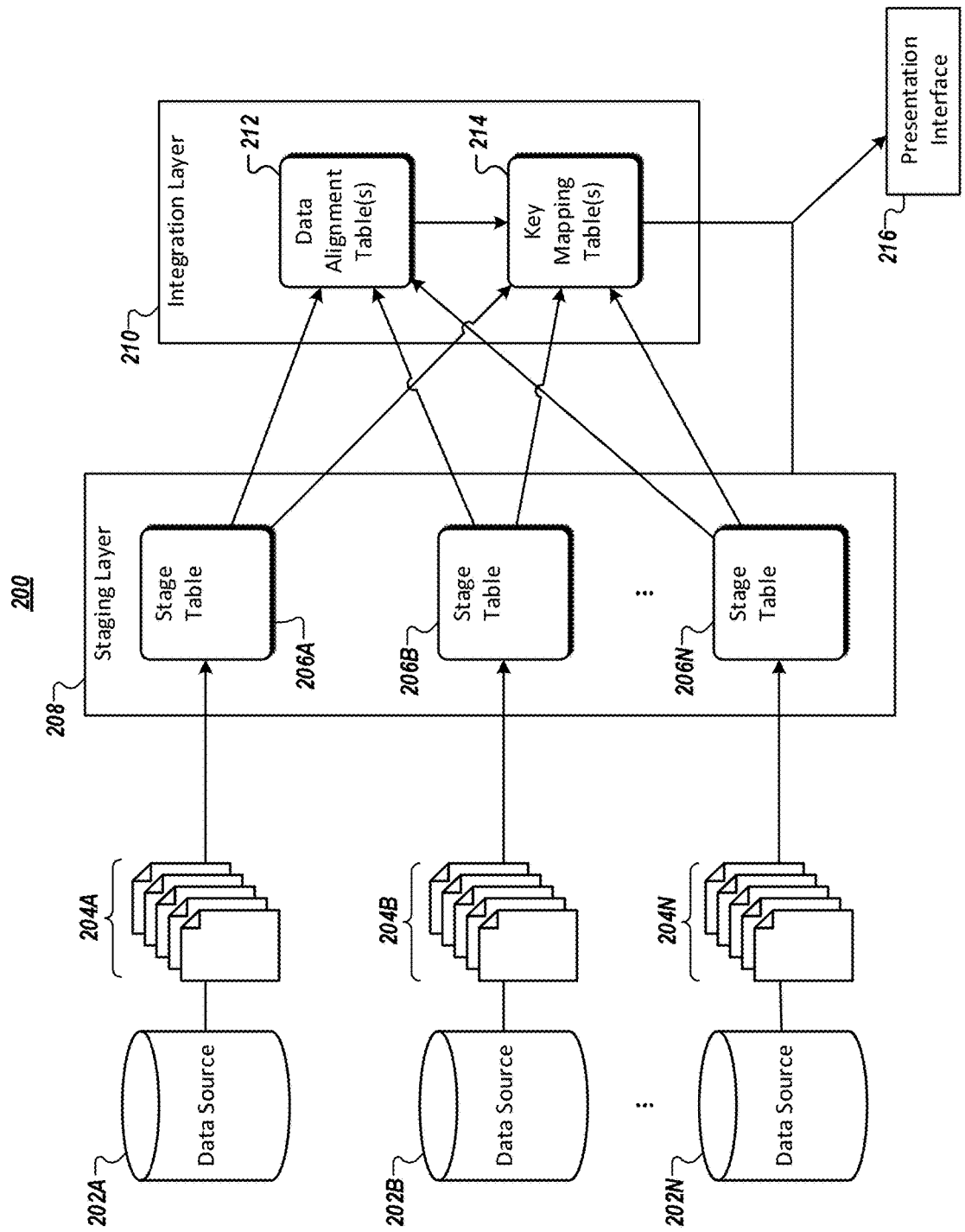
FIG. 2 illustrates a schematic diagram of an example data modeling platform, in accordance with some example embodiments described herein.

Turning to FIG. 2, a schematic diagram is provided illustrating an example data modeling platform 200 in accordance with some example embodiments described herein. As shown in FIG. 2, the data modeling platform 200 may retrieve one or more sets of records 204A-204N from a corresponding series of data sources 202A-202N. These sets of records may then be stored in corresponding stage tables (206A-206N) within a persistent staging layer 208 of the data modeling platform 200. It should be noted that, as opposed to traditional implementations that utilize a transient staging area, permanently persisting the staging layer facilitates both effective tracing of the data used by the data modeling platform 200 in the event of an audit, and also provides the ability to address errors in processing that affect any source data received by the staging layer, regardless of when that data was originally received (a problem that affects many traditional data modeling implementations is that errors may corrupt data that was received prior to some arbitrary retention window, rendering these errors unrecoverable).

Figure 3A:
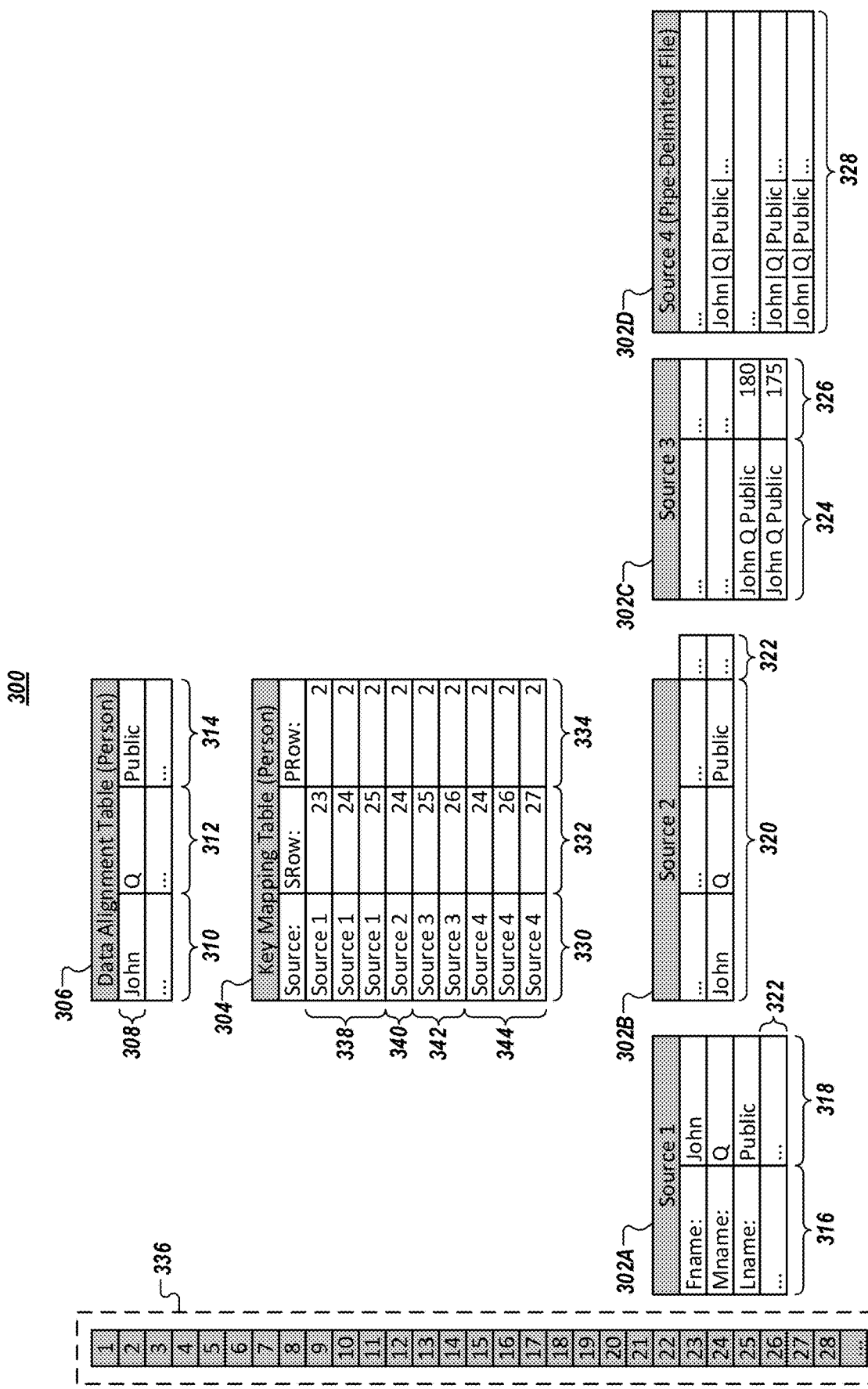
FIG. 3A illustrates a representation of an example data model that may be used by some example embodiments described herein.
Figure 3B:
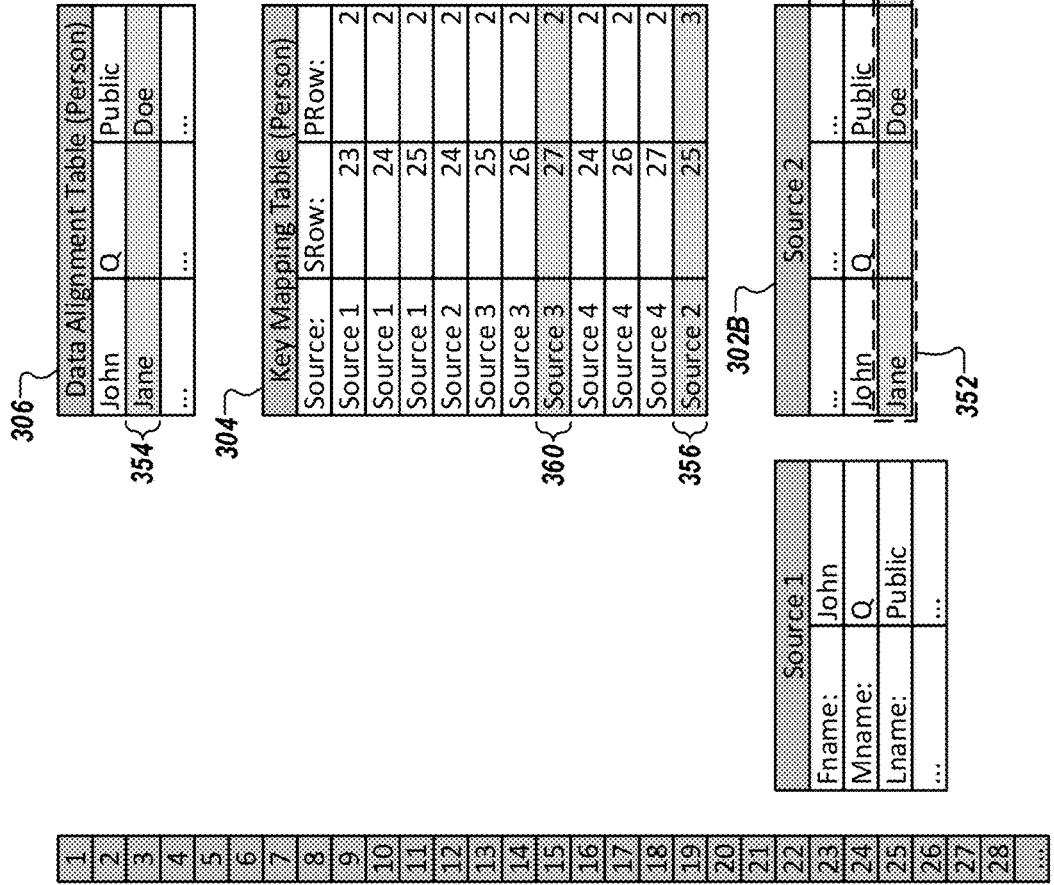
FIG. 3B illustrates a revised representation of the example data model of FIG. 3A after the addition of new records to a data source.

Each stage table 206 may comprise a type-2 data warehouse, ensuring that each change to a record will be stored in the stage table 206 as a new record, rather than overwriting the old version of the record (for instance, stage table 302C is modified from FIG. 3A and FIG. 3B in response to a revision to a record received from the corresponding data source, but this occurs via the creation of a new record in the stage table 302C, rather than replacement of an existing record). Permanently persisting records ensures that changes in the records represented by each stage table 206 can be tracked independently from the information contained in any other tables, because any pointers to a previously stored version of a record will not be affected by the storage of a new record (in contrast, physical replacement of an old version of a record with a newer version of that record may cause problems for other tables having pointers to the old version of the record). Accordingly, updating a stage table 206 requires no additional planning or knowledge. Moreover, the source data can remain entirely unprocessed once ingested and, in some embodiments, it may never be moved after its initial entry into the staging layer.

It should be noted that upon initial receipt of each record from a data source 202, the record may be stored in a stage table 206 corresponding to the data source 202 from which it was received, and the copied record may be modified by the data modeling platform 200 to include either or both (1) one or more plumbing fields to track changes over time, and (2) a timestamp illustrating when each change was added to the corresponding stage table 206. It will be understood that each data source can be interrogated periodically or on an ad hoc basis. For instance, the records contained in the data sources may be retrieved every night and imported into the staging layer for subsequent integration and utilization as soon as the following day. As another example, the records contained in the data sources may be retrieved and integrated at times of particularly low data utilization.

In an integration layer 210 of the platform, the data modeling platform 200 stores a set of data alignment tables 212, and each data alignment table 212 has a unique set of data fields. The data fields required for each data alignment table may be determined in JAD sessions (and, as noted elsewhere, these JAD sessions may or may not occur in parallel with the ingestion of data) and may be based on the semantics, modeling, or reporting needs of the data model. Data alignment tables that identify natural attributes (e.g., business keys) of certain atomic parts of the business (e.g., customers, employees, or the like) may be referred to herein as domain tables, while data alignment tables that identify the natural attributes of transactions between domains represented by domain tables (e.g., how often customers interacted with employees, when customers interacted with employees, etc.) may be referred to herein as relator tables. In this regard, domain tables are similar to data vault hubs and relator tables are similar to data vault links. As one example, it is often important to track the set of persons mentioned in data retrieved from the various data sources of a data model. To do this, a data alignment table 212 (e.g., data alignment table 306, shown in FIGS. 3A and 3B) may be created having the particular set of data fields needed to uniquely identify each person for the organization implementing the data model.

It should be appreciated that by defining data alignment tables 212 independently from ingestion of data into the staging layer, source data can be collected in the staging layer without a complete accounting of the needs of the data model, and there is no need to delay this data collection even if the requirements of the data model are not yet known. Accordingly, ingestion of data into the staging layer may occur in parallel with any JAD sessions, or the ingestion of data may even occur beforehand. In such fashion, example embodiments contemplated herein can therefore reduce the total time required to initialize the data model.

In the integration layer 210, the data modeling platform 200 also stores one or more key mapping table(s) 214 corresponding to a respective data alignment table 212 (it will be appreciated that while FIG. 2 illustrates only a single element illustrating the data alignment table(s) 212 and a single element identifying the key mapping table(s) 214 for ease of illustration, additional data alignment tables 212 and key mapping tables 214 may be included in the integration layer 210 as appropriate to accurately model the needs of the organization). Each key mapping table 214 acts as a bridging layer between a corresponding data alignment table 212 and the underlying stage tables 206A-206N. Thus, each key mapping table 214 contains a series of references to the data in stage tables 206A-206N. For a particular type of information tracked by a first domain table 212, the corresponding field in a first stage table 206A may be different than the corresponding field in a second stage table 206B, so the key mapping table 214 will include a pointer to the location of the particular information in first stage table 206A and another pointer to the location of the particular information in the second stage table 206B. It will be understood that the use of pointers illustrated in this fashion comprises a "flyweight" design pattern because the use of references to data (e.g., pointers) avoids the need to copy the data itself.

As an example, a particular data alignment table 212 may comprise a domain table defining the required information regarding patients. The domain table may include fields for a first, middle, and last name of each patient identified in one of the stage tables 206A-206N. The data modeling platform 200 may, in response to generation of the domain table, generate a key mapping table that includes a pointer to the field in each stage table 206 that will store each individual's first name, a separate pointer to the field that will store each individual's middle name, and a third pointer to the field that will store each individual's last name. In this fashion, the key mapping table 214 can be thought of as a bridging layer that links the domain table with the staging layer.

The data modeling platform 200 may also provide a separate presentation interface 216 to provide users with responses to queries of the data model made by various users (e.g., user 106). This presentation interface 216 may be the only interface visible to the querying users, as the tables contained in the staging layer and integration layer information—while used to respond to queries—may not be visible to users. To provide this information, the data modeling platform 200 may retrieve identifying data from a given data alignment table (e.g., a domain or relator table) and may retrieve describing data from a given stage table. The data alignment table and the stage table are linked via the key mapping table.

Illustration of the manner by which the data modeling platform 200 may operate is better understood in connection with FIGS. 3A and 3B, which provides an example representation utilized by an example data modeling platform 200. FIG. 3A discloses a first state of the data model, and FIG. 3B, in turn, illustrates how changes to the data contained in data sources can be introduced into the data model.

Turning first to FIG. 3A, representation 300 illustrates a series of stage tables 302A-302D, a key mapping table 304, and a data alignment table 306. As shown Data alignment table 306 identifies three pieces of information relating to each distinct person 308 identified in the source data: the person's first name 310, middle name 312, and last name 314. In this example, as may often be the case in real-world scenarios, stage tables 302A-302D represent this information in different ways.

Stage table 302A, for instance, includes an initial column 316 defining the fields storing the related information, and a subsequent column 318 that includes the corresponding information for person 308. Stage table 302B, however, stores each record on its own row, and the information corresponding to person 308 is stored in the fields shown by bracket 320. In turn, brackets 322 illustrate that stage tables 302A and 302B also include additional fields associated with the person 308. These additional fields may include information that is not relevant to the data alignment table 306, but may also include additional plumbing fields that facilitate the tracking of changes over time (these plumbing fields are described in greater detail below). Stage table 302C represents the information from person 308 in yet another way, with all identifying information in a single field 324. In addition, stage table 302C stores additional information regarding person 308 (his weight) in the fields in column 326. Notably, stage table 302C includes multiple records corresponding to John Q Public. Although there is no field 322 shown in FIG. 3A, it will be understood that stage table 302C will include plumbing fields for each of the records in similar fashion as stage tables 302A and 302B. Finally, stage table 302D may comprise a pipe delimited file, in which all of the information for each record is contained in a single field, with each distinct piece of information about the person separated by a "|" character.

The key mapping table 304 may then comprise a series of pointers to the data contained in stage tables 302A-302D and the distinct persons identified in the data alignment table 306. The first column of the key mapping table (330), titled "Source:", references a particular stage table, while the second column of the key mapping table (332), titled "SRow:", references a particular row in that stage table. The third column of the key mapping table (334), titled "PRow:", references a particular row of the data alignment table corresponding to the information referenced in columns 330 and 332. It will be understood, in this regard, that the "row" referenced in the data fields in column 332 and 334 reference the numbered rows shown in box 336. Thus, as illustrated by bracket 338, person 308 is referenced in three rows of stage table 302A (rows 23, 24, and 25) and row 2 of data alignment table 306. Similarly, bracket 340 shows that person 308 is referenced in a single row of stage table 302B (row 24). Bracket 342 shows that person 308 is referenced in two rows of stage table 302C (rows 25 and 26). Finally, bracket 344 shows that person 308 is referenced in three rows of stage table 302D (rows 24, 26, and 27).

FIG. 3B then illustrates a new representation, 350, showing how ingestion of new data from data sources can affect the data model. In the example shown in FIG. 3B, the data source corresponding to stage table 302B has transmitted a new record referencing a new person, Jane Doe. The receipt of this new record thus introduces a new record 352 into the stage table 302B. In turn, introduction of a new distinct person into the data model propagates a change to the data alignment table 306, which therefore includes a new line item 354 corresponding to the new person. Furthermore, the key mapping table thus includes a new row 356 linking the new data in stage table 302B with the new distinct person identified in data alignment table 306.

Similarly, in the example of FIG. 3B, the data source corresponding to stage table 302C has transmitted a revised record corresponding to person 308 (John Q Public). Because stage table 302C is a type-2 data warehouse, the prior record is not overwritten, and instead the receipt of this revised record thus introduces a new record 358 into the stage table 302C. Because this new record does not represent a new distinct person, it does not cause any change to the data alignment table 306. However, the key mapping table is modified to include a new row 360 linking the new data in stage table 302C with the preexisting person identified in data alignment table 306.

System Architecture

Methods, apparatuses, and computer program products of the present invention may be embodied by any of a variety of devices. Example embodiments may include a plurality of devices operating in a globally-networked system. In doing so, example embodiments may utilize any of a variety of fixed terminals, such as desktop computers, mainframe devices, kiosks, or the like. Similarly, example embodiments may also utilize any of a variety of mobile terminals, such as a portable digital assistant (PDA), mobile telephone, smartphone, laptop computer, tablet computer, or any combination of the aforementioned devices.

Figure 4:
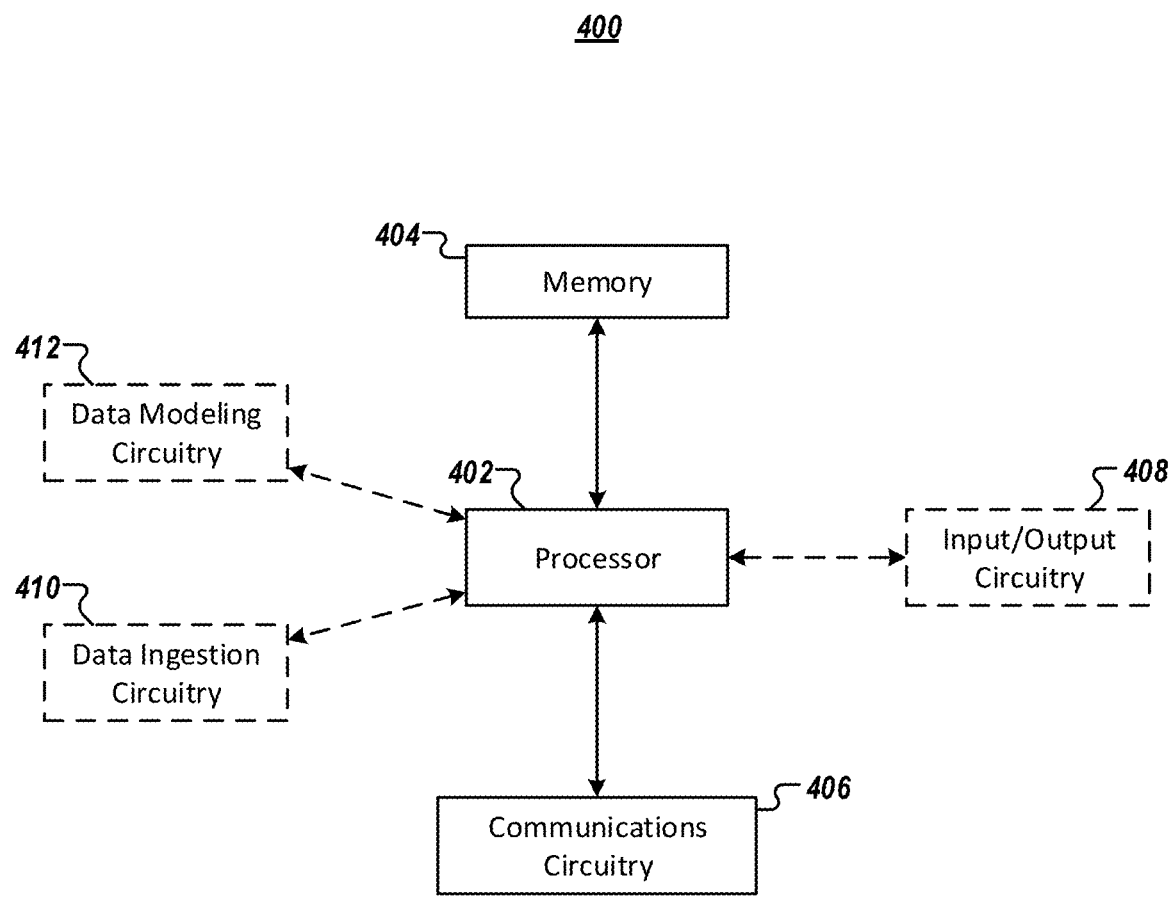
FIG. 4 illustrates a schematic block diagram of example circuitry embodying a device that may perform operations in accordance with some example embodiments described herein.

Turning to FIG. 4, an example apparatus 400 is illustrated that may represent a basic set of components of a device embodying an example system. The apparatus 400 may include a processor 402, a memory 404, and communications circuitry 406. In some embodiments, the device may further include input/output circuitry 408 for interacting with a user, a data ingestion circuitry 410 for receiving and staging data in a staging layer, and data modeling circuitry 412 for populating the data model based on the staged data. The apparatus 400 may be configured to execute the operations described below in connection with FIGS. 5-7. Although these components 402-412 are described with some functional descriptors, it should be understood that the particular implementations necessarily include the use of particular hardware. It should also be understood that certain of these components 402-412 may include similar or common hardware. For example, the data ingestion circuitry 410 and data modeling circuitry 412 may leverage use of the processor 402, memory 404, or communications circuitry 406, to perform its associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

In some embodiments, the processor 402 (and/or co-processor or any other processing circuitry assisting or otherwise associated with the processor) may be in communication with the memory 404 via a bus for passing information among components of the apparatus. The processor 402 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 402 may be configured to execute instructions stored in the memory 404 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 404 may be non-transitory and may include, for example, one or more volatile and/or non-volatile memories. In other words, for example, the memory may be an electronic storage device (e.g., a computer readable storage medium). The memory 404 may be configured to store information, data, content, applications, instructions, or the like, for enabling the apparatus to carry out various functions in accordance with example embodiments contemplated herein.

The communications circuitry 406 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 406 may include, for example, a network interface for enabling communications with a wired or wireless communication network. For example, the communications circuitry 406 may include one or more network interface cards, antennae, buses, switches, routers, modems, and supporting hardware and/or software, or any other device suitable for enabling communications via a network. Additionally or alternatively, the communication interface 406 may include the circuitry for interacting with the antenna(s) to cause transmission of signals via the antenna(s) or to handle receipt of signals received via the antenna(s). These signals may be transmitted by the apparatus 400 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In some embodiments, the apparatus 400 may include input/output circuitry 408 that may, in turn, be in communication with processor 402 to provide output to a user and, in some embodiments, to receive an indication of user input. The input/output circuitry 408 may comprise a user interface and may include a display that may include a web user interface, a mobile application, a client device, or the like. In some embodiments, the input/output circuitry 408 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

In addition, the apparatus 400 may also comprise data ingestion circuitry 410, which includes hardware components designed to facilitate the retrieval and staging of data in a staging layer of the data modeling platform. Data ingestion circuitry 410 may utilize processor 402, memory 404, or any other hardware component included in the apparatus 400 to perform these functions. Data ingestion circuitry 410 may further utilize communications circuitry 106 to receive data from the variety of data sources.

Data ingestion circuitry 410 may utilize processing circuitry, such as the processor 402, to facilitate performance of its various operations, and may utilize memory 404 to store state computer instructions that, when executed, cause the data ingestion circuitry 410 to perform those operations. It should be appreciated that, in some embodiments, data ingestion circuitry 410 may include a separate processor, specially configured field programmable gate array (FPGA), or application specific interface circuit (ASIC) to perform the above-described functions. Data ingestion circuitry 410 is therefore implemented using hardware components of the apparatus configured by either hardware or software for implementing these planned functions.

In addition, the apparatus 400 may also comprise data modeling circuitry 412, which includes hardware components designed to populate the data model based on the staged data. Data modeling circuitry 412 may utilize processor 402, memory 404, or any other hardware component included in the apparatus 400 to perform this function.

Data modeling circuitry 412 may utilize processing circuitry, such as the processor 402, to facilitate performance of its various operations, and may utilize memory 404 to store state computer instructions that, when executed, cause the data ingestion circuitry 410 to perform those operations. It should be appreciated that, in some embodiments, data modeling circuitry 412 may include a separate processor, specially configured field programmable gate array (FPGA), or application specific interface circuit (ASIC) to perform the above-described functions. Data modeling circuitry 412 is therefore implemented using hardware components of the apparatus configured by either hardware or software for implementing these planned functions.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatus 400 as described in FIG. 4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example device (e.g., apparatus 400) that may be utilized to implement some embodiments of the data modeling platform 200 described above, example embodiments of the present invention are described below in connection with a series of flowcharts.

Figure 5:
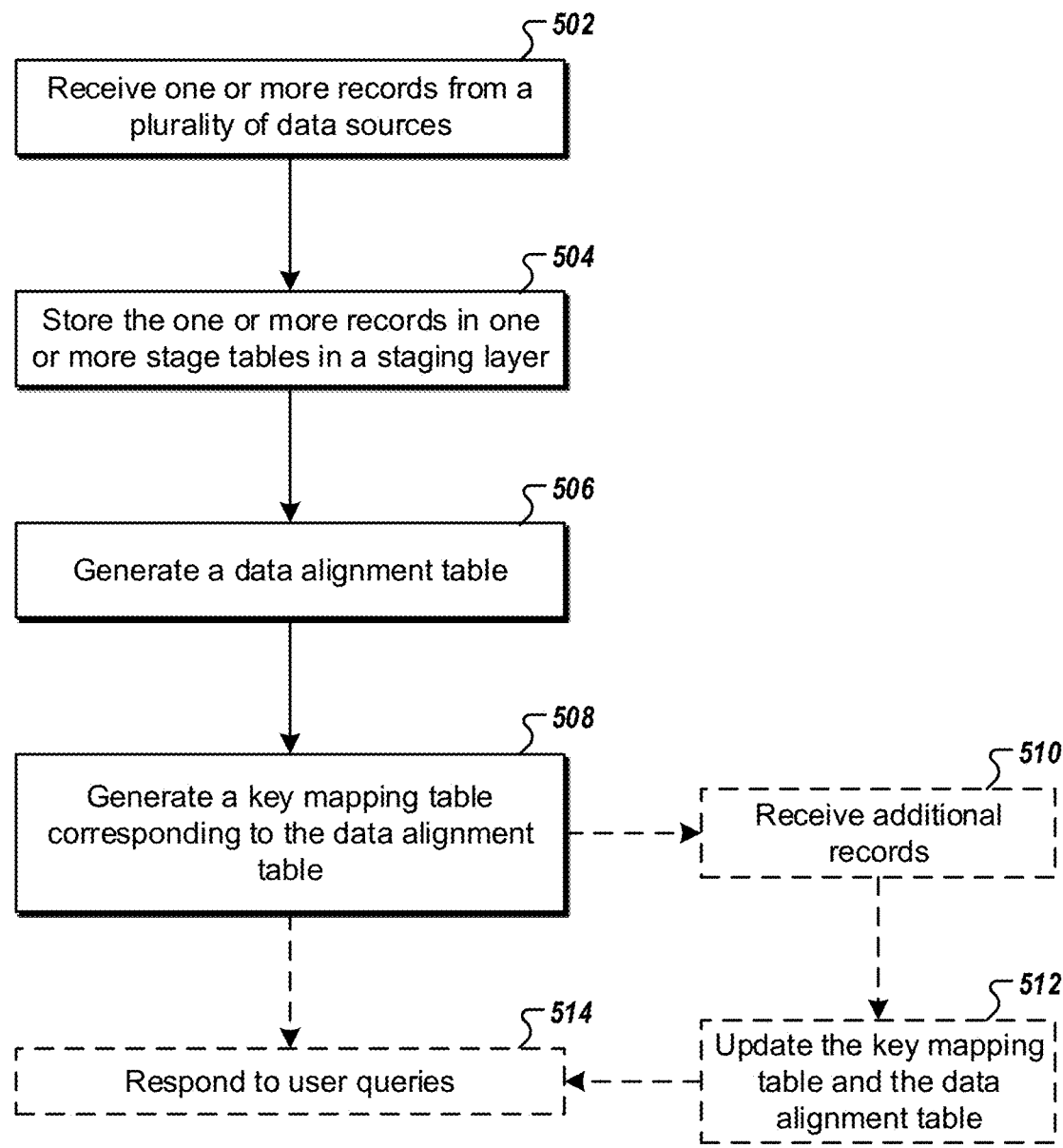
FIG. 5 illustrates a flowchart describing example operations performed by a data modeling platform to improve data modeling in a relational database management system, in accordance with some example embodiments described herein.
Figure 6:
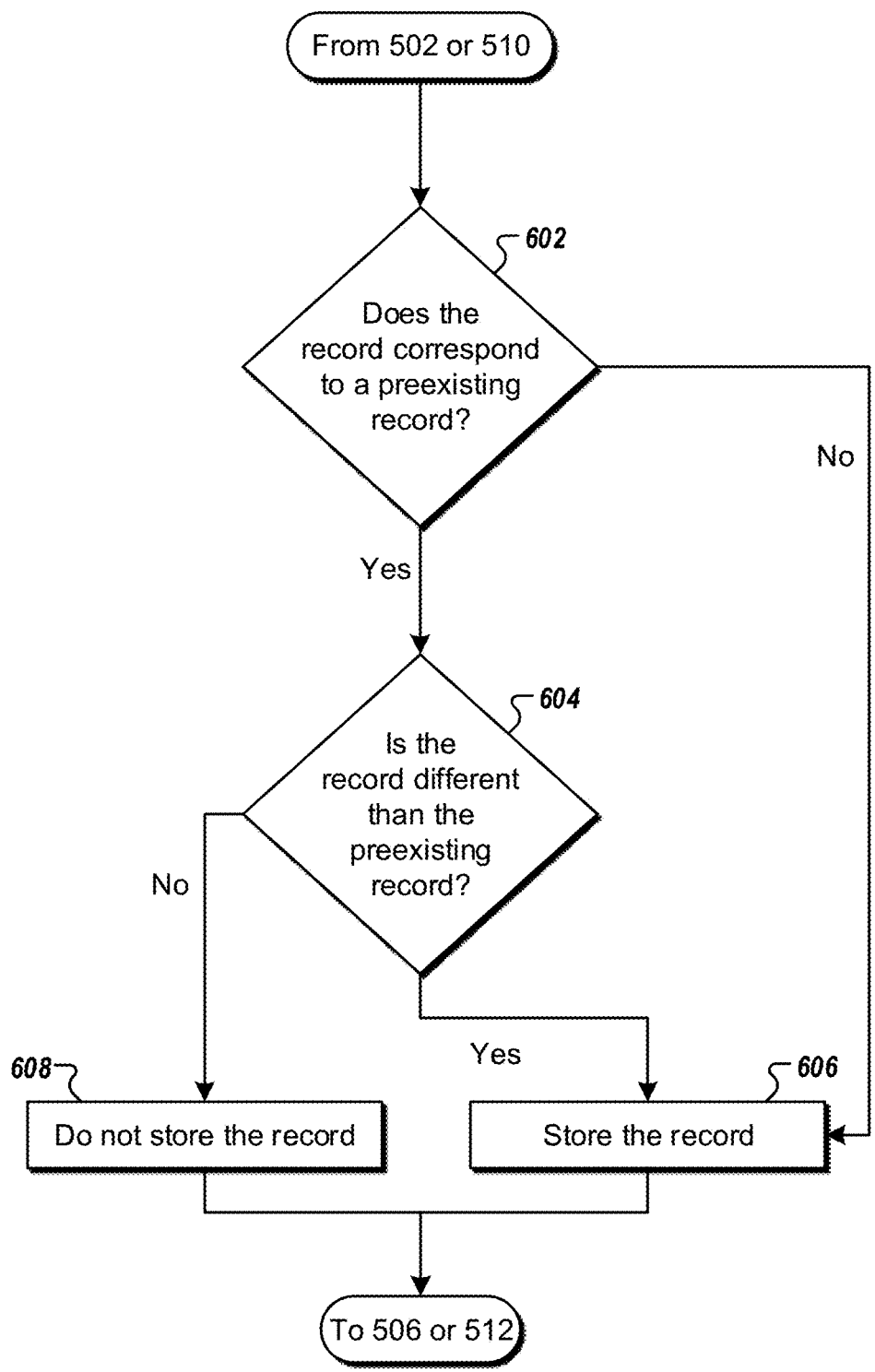
FIG. 6 illustrates a flowchart describing example operations for analyzing in-bound records and determining whether to store them in the staging layer, in accordance with some example embodiments described herein.
Figure 7:
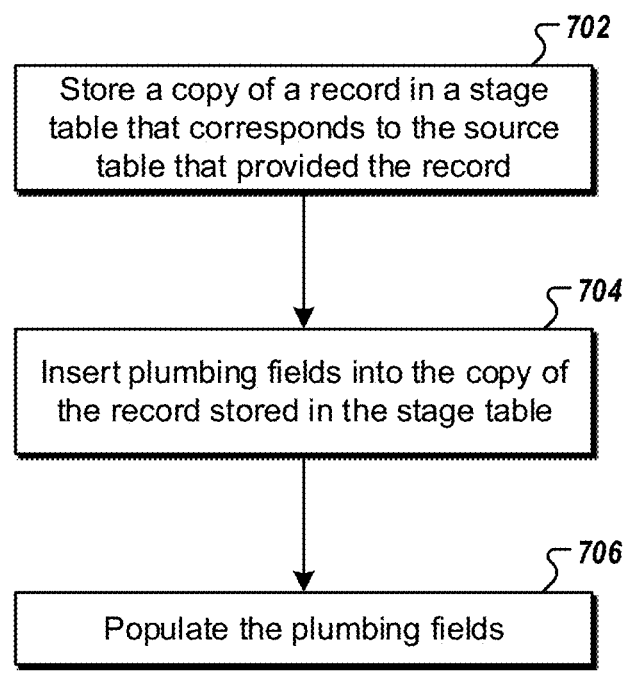
FIG. 7 illustrates a flowchart describing example operations for storing a target record that is received from a particular data source, in accordance with some example embodiments described herein.

Operations for Improving Efficiency and Reliability of a Data Modeling Platform Turning to FIGS. 5, 6, and 7, flowcharts are illustrated that contain operations to increase the efficiency and reliability of a database modeling platform. The operations illustrated in FIGS. 5, 6, and 7 may, for example, be performed by, with the assistance of, and/or under the control of an apparatus 400 embodying a device operatively controlling a database modeling platform 200 and more particularly through the use of one or more of processor 402, memory 404, communications circuitry 406, input/output circuitry 408, data ingestion circuitry 410, and data modeling circuitry 412.

Turning first to FIG. 5, example operations are provided for improved data modeling in a relational database management system. To begin with, the apparatus 400 includes means, such as data ingestion circuitry 410 or the like, for ingesting one or more records from a plurality of data sources into one or more stage tables in a staging layer. This data ingestion operation may include two sub-steps: receiving the one or more records and storing the one or more records, as discussed in connection with operations 502 and 504.

In operation 502 the apparatus 400 includes means, such as communications circuitry 306, input/output circuitry 308, data ingestion circuitry 410, or the like, for receiving one or more records from the plurality of data sources. Each data source may correspond to a separate business entity in some embodiments. For instance, one data source may comprise patient records from a hospital, while another data source may be patient records from a particular doctor's office, and a third data source may comprise an insurer's patient records. In other embodiments, multiple data sources may correspond to the same business entity. As mentioned previously, the one or more records may be retrieved from the plurality of data sources on a periodic basis (e.g., every night), on a less regular basis as determined by system utilization (e.g., data is retrieved in a batch process whenever utilization of the data modeling platform 200 is below some predetermined threshold), on an event-driven basis, or the like.

In operation 504 the apparatus 400 includes means, such as memory 404, data ingestion circuitry 410, or the like, for storing the one or more records in one or more stage tables in a staging layer. Each of the one or more stage tables corresponds to one of the plurality of data sources. Moreover, each of the one or more stage tables comprises a type-2 data warehouse. Storage of records in the staging layer is described in greater detail below in connection with FIGS. 6 and 7. It will be appreciated that it may not be known what each data field in each of the one or more stage tables actually represents at the time of data ingestion. However, to interpret and utilize the data in each of the one or more stage tables, one needs to understand what content is represented by each record in each stage table within the staging layer.

Accordingly, in some example embodiments contemplated herein, the apparatus 400 may include means, such as data modeling circuitry 412, or the like, for retrieving a definition set defining the type of information stored in each data field of a particular stage table. The definition set may be retrieved from the data source via communications circuitry 406 or it may be retrieved from manual user entry via input/output circuitry 408. In any event, this definition set can then be used by the apparatus 400 to interpret the data in each record of the particular stage table (e.g., for subsequently populating a data alignment table or key mapping table). Each definition set may be manually created by a person who has a preexisting understanding of the data source corresponding to the particular stage table. Alternatively, in some embodiments a known definition set used for a different stage table may also be used for the particular stage table, if it can be determined that the data source corresponding to that different stage table is associated with the data source corresponding to the particular stage table.

In operation 506 the apparatus 400 includes means, such as data modeling circuitry 412 or the like, for generating a data alignment table defining a unique set of data fields. As noted previously, the data alignment table may comprise a domain table or a relator table. It should be noted that many embodiments of the data modeling platform 200 may utilize more than one data alignment table. It should also be noted that, as discussed previously, the operation of generating the data alignment table may occur after ingesting the one or more records from the plurality of data sources, thus avoiding the need to delay data ingestion.

As one aspect of generating the data alignment table, the apparatus 400 may include means, such as data modeling circuitry 412 or the like, for populating fields in the data alignment table. In this regard, the apparatus 400 may include means, such as data modeling circuitry 412 or the like, for identifying, within a particular stage table, a record having a unique combination of values for the unique set of data fields defined by the data alignment table. Furthermore, the apparatus 400 may include means, such as data modeling circuitry 412, for generating a new record in the data alignment table corresponding to the identified record, and for populating fields in the data alignment table for the generated record based on the unique combination of values in the record from the particular stage table. These fields in the data alignment table correspond to the unique set of data fields defined by the data alignment table. In some embodiments, the fields in the data alignment table store hashes of the unique combination of values in the record from the particular stage table, and in further embodiments these fields are stored in the data alignment table along with a change data capture key (e.g., CDC_KEY) of the particular stage table. The data alignment table may also store unhashed data, but it should be noted in this regard that each data alignment table will only store a single copy of any given set of data. In this regard, if another record is identified in one of the stage tables that has the same combination of values as a record in the data alignment table, that newly discovered record will not form the basis of a new record in the data alignment table.

In operation 508 the apparatus 400 includes means, such as data modeling circuitry 412 or the like, for generating, using the one or more stage tables and the data alignment stable, a key mapping table identifying correspondences between data fields in the one or more stage tables and the data fields in the data alignment table. In this regard, the key mapping table may be populated using the unique set of data fields identified by the respective data alignment table and based on the distinct entities or transactions represented by the data alignment table. As with population of the data alignment table, populating the key mapping table may utilize one or more definition sets corresponding to the one or more stage tables as a tool for interpreting the data stored in the one or more stage tables. Unlike the data alignment table, however, the key mapping tables may contain hashed data only and can contain multiples copies of a particular hash pointing to any number of staging table CDC_KEYs.

From operation 508, the procedure may advance to operation 514 below. Additionally or alternatively, the procedure may advance to optional operations 510 and 512 below.

As noted previously, receipt of records from the plurality of data sources may occur periodically or, in any event, may occur more than a single time. Accordingly, in optional operation 510, the apparatus 400 may include means, such as data ingestion circuitry 410 or the like, for ingesting one or more additional records from the plurality of data sources into the one or more stage tables in the staging layer.

From operation 510, the procedure may advance to optional operation 512, in which the apparatus 400 may include means, such as data modeling circuitry 412, or the like, for updating the data alignment table based on ingested one or more additional records updating the data alignment table and the key mapping table based on the ingested one or more additional records. Subsequently, the procedure may advance to optional operation 416 in an instance in which a user query is received.

In optional operation 514, the apparatus 400 may include means, such as processor 402, communications circuitry 406, input/output circuitry 408, or the like, for responding to user queries. In some embodiments, operation 514 may include processing a query requesting information for retrieval, identifying, using the key mapping table, data corresponding to the information for retrieval from a subset of the one or more stage tables or the data alignment table, and outputting the identified data. More specifically, the apparatus 400 may identify the information for retrieval using the key mapping table, which links the data alignment table to the various stage tables. The apparatus 400 can then retrieve identifying data from the data alignment table (e.g., a domain or relator table) and may retrieve describing data from one or more of the stage tables, and output the collected information.

Turning next to FIG. 6, example operations are described for analyzing in-bound records and determining whether to store them in the staging layer, in accordance with example embodiments described herein. As such, the operations described in connection with FIG. 6 illustrate example refinements of operations 504 and 512 of FIG. 4. In this regard, the operations described in connection with FIG. 6 may follow from operations 502 or 510, described above, and may in turn be followed by operations 506 or 514. In this regard, FIG. 6 illustrates a scenario in which a set of records are received from a plurality of data sources. For each particular record received, the following procedure may be implemented in some embodiments.

In operation 602 the apparatus 400 includes means such as data ingestion circuitry 410 or the like, for determining whether the particular record corresponds to a preexisting record in one of the stage tables in the staging layer. In an instance in which the particular record does correspond to a preexisting record, then the procedure advances to operation 604. If the particular record does not correspond to a preexisting record, however, the particular record is new, and the procedure advances to operation 606 to ingest the record.

In operation 604 the apparatus 400 includes means such as data ingestion circuitry 410, or the like, for determining whether the particular record is different than the preexisting record. In some embodiments, this may include a character comparison between the data contained in the particular record to the data contained in the preexisting record in the stage table.

In operation 606 the apparatus 400 includes means such as data ingestion circuitry 410 or the like, for storing the record in a stage table corresponding to the data source from which the particular record is received. Storage of records is described in greater detail below in connection with FIG. 7.

In operation 608, it is determined that the record is a duplicate, and the particular record is not stored, in which case the procedure returns to operation 506 or 512, described previously.

Turning next to FIG. 7, example operations are disclosed for ingesting a target record that is received from a particular data source, in accordance with some example embodiments described herein.

In operation 702, the apparatus 400 includes means such as data ingestion circuitry 410 or the like, for storing a copy of the target record in a particular stage table in the staging layer that corresponds to the particular data source.

In operation 704, the apparatus 400 includes means such as data ingestion circuitry 410 or the like, for inserting plumbing fields into the copy of the target record in the stage table. These plumbing fields comprise a set of descriptive fields and a timestamp field, and the descriptive fields, when populated, facilitate the determination, by the data modeling platform 200, of changes in the record over time.

In operation 706, the apparatus 400 includes means such as data ingestion circuitry 410 or the like, for populating the plumbing fields. In some embodiments, the apparatus 400 may populate the descriptive fields based on the content of the target record. Additionally, the apparatus 400 may populate the timestamp field with a current date and time representing the time of ingestion.

As described above, example embodiments described herein provide methods and apparatuses that can increase the efficiency and reliability of a database modeling platform. To do this, example embodiments enable the ingestion of data before, after, or in parallel with evaluating and identifying business requirements for the data model. Similarly, through the use of type-2 data warehousing, example embodiments provide complete traceability of data back to the data sources, thus ensuring that the data modeling platform can efficiently respond to audits. Similarly, by employing a persistent staging layer, example embodiment also prevent the occurrence of unrecoverable errors because no source data is ever removed from the data modeling platform.

FIGS. 5-7 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 400 employing an embodiment of the present invention and executed by a processor of the apparatus 400. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for improved data modeling in a relational database management system, the method comprising:
    ingesting, by data ingestion circuitry, one or more records from a plurality of data sources into one or more stage tables in a persistent staging layer, wherein each of the one or more stage tables corresponds to one of the plurality of data sources;
    generating, by data modeling circuitry, a data alignment table independently from the ingestion of the one or more records into the persistent staging layer, wherein the data alignment table, comprises, for each distinct record of the one or more records, at least one unique data field; and
    generating, by the data modeling circuitry and using the one or more stage tables and the data alignment table, a key mapping table identifying correspondences between data fields in the one or more stage tables for each distinct record of the one or more records and the at least one unique data field for each record of the one or more records in the data alignment table.

2. The method of claim 1, further comprising:
    processing a query requesting information for retrieval;
    identifying, by the data modeling circuitry using the key mapping table, data corresponding to the information for retrieval from a subset of the one or more stage tables and the data alignment table; and
    outputting the identified data.

3. The method of claim 1, wherein each of the plurality of data sources adheres to a data model.

4. The method of claim 1, wherein ingesting the one or more records into the one or more stage tables in the persistent staging layer includes, for each particular record of the one or more records:
    determining whether the particular record corresponds to a preexisting record in the one or more of the stage tables in the persistent staging layer;
    in an instance in which the particular record corresponds to a preexisting record, determining whether the particular record is different than the preexisting record, and in an instance in which the particular record is different than the preexisting record, storing the particular record; and
    in an instance in which the particular record does not correspond to a preexisting record, storing the particular record.

5. The method of claim 1, wherein the step of generating the data alignment table is performed after ingesting the one or more records from the plurality of data sources.

6. The method of claim 1, wherein the data alignment table comprises a domain table or a relator table.

7. The method of claim 1, wherein generating the data alignment table includes:
    identifying, by the data modeling circuitry and within one of the one or more stage tables, a record having a unique combination of values for a unique set of data fields defined by the data alignment table;
    generating, by the data modeling circuitry, a new record in the data alignment table corresponding to the identified record; and
    populating fields in the data alignment table for the generated new record based on the unique combination of values.

8. The method of claim 7, further comprising:
    ingesting, by the data ingestion circuitry, one or more additional records from the plurality of data sources into the one or more stage tables in the persistent staging layer;
    updating, by the data modeling circuitry, the data alignment table based on the ingested one or more additional records; and
    updating, by the data modeling circuitry, the key mapping table based on the ingested one or more additional records.

9. An apparatus for improved data modeling in a relational database management system, the apparatus comprising at least one processor and memory storing computer-executable instructions that, when executed by the at least one processor, cause the apparatus to;
    ingest one or mare records from a plurality of data sources into one or more stage tables in a persistent staging layer, wherein each of the one or more stage tables corresponds to one of the plurality of data sources;
    generate a data alignment table independently from the ingestion of the one or more records into the persistent staging layer, wherein the data alignment table comprises, for each distinct record of the one or more records, at least one unique data field; and
    generate, using the one or more stage tables and the data alignment table, a key mapping table identifying correspondences between data fields in the one or more stage tables for each distinct record of the one or more records and the at least one unique data field for each record of the one or more records in the data alignment table.

10. The apparatus of claim 9, wherein the computer-executable instructions, when executed by the at least one processor, further cause the apparatus to:
process a query requesting information for retrieval;
identify, using the key mapping table, data corresponding to the information for retrieval from a subset of the one or more stage tables and the data alignment table; and
output the retrieved data.

11. The apparatus of claim 9, wherein each of the plurality of data sources adheres to a data model.

12. The apparatus of claim 9, wherein ingesting the one or more records into the one or more stage tables in the persistent staging layer includes, for each particular record of the one or more records:
determining whether the particular record corresponds to a preexisting record in the one or more of the stage tables in the persistent staging layer;
in an instance in which the particular record corresponds to a preexisting record,
determining whether the particular record is different than the preexisting record, and in an instance in which the particular record is different than the preexisting record, storing the particular record; and
in an instance in which the particular record does not correspond to a preexisting record, storing the particular record.

13. The apparatus of claim 9, wherein the computer-executable instructions, when executed by the at least one processor, cause the apparatus to generate the data alignment table after ingesting the one or more records from the plurality of data sources.

14. The apparatus of claim 9, wherein the data alignment table comprises a domain table or a relator table.

15. The apparatus of claim 9, wherein the computer-executable instructions, when executed by the at least one processor, further cause the apparatus to generate the data alignment table by causing the apparatus to:
identify, within one of the one or more stage tables, a record having a unique combination of values for a unique set of data fields defined by the data alignment table;
generate a new record in the data alignment table corresponding to the identified record; and
populate fields in the data alignment table for the generated new record based on the unique combination of values.

16. The apparatus of claim 15, wherein the computer-executable instructions, when executed by the at least one processor, further cause the apparatus to:
ingest one or more additional records from the plurality of data sources into the one or more stage tables in the persistent staging layer;
update the data alignment table based on the ingested one or more additional records; and
update the key mapping table based on the ingested one or more additional records.

17. A computer program product comprising at least one non-transitory computer-readable storage medium for improved data modeling in a relational database management system, the at least one non-transitory computer-readable storage medium storing computer-executable instructions that, when executed, cause an apparatus to:
ingest one or more records from a plurality of data sources into one or more stage tables in a persistent staging layer, wherein each of the one or more stage tables corresponds to one of the plurality of data sources,
generate a data alignment table independently from the ingestion of the one or more records into the persistent staging layer, wherein the data alignment table comprises, for each distinct record of the one or more records, at least one unique data field; and
generate, using the one or more stage tables and the data alignment table, a key mapping table identifying correspondences between data fields in the one or more stage tables for each distinct record of the one or more records and the at least one unique data field for each record of the one or more records in the data alignment table.

18. The computer program product of claim 17, wherein the computer-executable instructions, when executed, further cause the apparatus to:
process a query requesting information for retrieval;
identify, using the key mapping table, data corresponding to the information for retrieval from a subset of the one or more stage tables and the data alignment table; and
output the retrieved data.

19. The computer program product of claim 17, wherein each of the plurality of data sources adheres to a data model.

20. The computer program product of claim 17, wherein ingesting the one or more records into the one or more stage tables in the persistent staging layer includes, for each particular record of the one or more records:
determining whether the particular record corresponds to a preexisting record in the one or more of the stage tables in the persistent staging layer;
in an instance in which the particular record corresponds to a preexisting record, determining whether the particular record is different than the preexisting record, and in an instance in which the particular record is different than the preexisting record, storing the particular record; and
in an instance in which the particular record does not correspond to a preexisting record, storing the particular record.

* * * * *